United States Patent [19]

Sharples

[11] Patent Number: 4,457,737
[45] Date of Patent: Jul. 3, 1984

[54] SMALL DIAMETER SHAFT CONNECTION
[75] Inventor: Thomas D. Sharples, Atherton, Calif.
[73] Assignee: Beckman Instruments, Inc., Fullerton, Calif.
[21] Appl. No.: 271,349
[22] Filed: Jun. 8, 1981
[51] Int. Cl.³ .............................. F16C 3/00; F16D 3/76
[52] U.S. Cl. ........................................ 464/99; 29/520; 29/522 R; 403/372; 464/182
[58] Field of Search ............. 29/520, 522 R; 403/372; 464/82, 83, 89, 179, 182, 183, 30, 98, 99

[56] References Cited

U.S. PATENT DOCUMENTS

| 174,266 | 2/1876 | Luders . | |
|---|---|---|---|
| 1,817,775 | 8/1931 | Sipe . | |
| 2,110,096 | 3/1938 | Strecker | 251/103 |
| 2,257,008 | 9/1941 | Henn | 20/92 |
| 2,417,181 | 3/1947 | Sandilands | 166/14 |
| 2,460,510 | 2/1949 | Laesser | 403/372 |
| 2,558,589 | 6/1951 | Skolfield | 469/89 |
| 2,613,968 | 10/1952 | Harstick et al. . | |
| 2,785,453 | 3/1957 | Wentz | 403/372 X |
| 3,230,739 | 1/1966 | Stewart | 464/89 X |
| 3,382,567 | 5/1968 | Schaeffler | 29/522 R |
| 3,438,660 | 4/1969 | Steiner . | |
| 3,779,451 | 12/1973 | Lehman | 464/89 X |
| 4,041,730 | 8/1977 | Kress | 464/89 X |
| 4,065,219 | 12/1977 | Levine | 464/89 X |

*Primary Examiner*—Stuart S. Levy
*Assistant Examiner*—Daniel P. Stodola
*Attorney, Agent, or Firm*—R. J. Steinmeyer; F. L. Mehlhoff; A. A. Canzoneri

[57] ABSTRACT

A torque-transmitting connector is disclosed which fits between a spindle and the walls of a bore in a rotating member. The connector includes a sleeve encircling the spindle and two flanges located at its opposite ends. Each flange is initially frustoconical, and is forced into substantially a disc shape to grip the spindle and the wall of the bore. The flange at the bottom of the bore is flattened first by a small diameter punch acting against the other end of the sleeve; and the other flange is then flattened by an annular punch encircling the small diameter punch.

5 Claims, 7 Drawing Figures

SMALL DIAMETER SHAFT CONNECTION

BACKGROUND OF THE INVENTION

The present invention relates to an improved structure and method for facilitating the connection of a small diameter shaft to a substantially larger rotor having a bore into which the shaft extends. One of the important uses for the invention is in providing a connection between a centrifuge rotor and the spindle which drives it.

Centrifuge rotors are normally driven with very small shafts, or spindles, in order to minimize vibration problems at the extremely high speeds required. Significant manufacturing and structural problems are encountered in connecting the ends of such a spindle to the much larger diameter structures located at its opposite ends, the centrifuge rotor at one end, and the driving motor at the other end.

The present invention was developed for the purpose of providing a torque-transmitting connection between a spindle and a substantially larger diameter bore in a motor-driven shaft. However, the invention may be useful wherever a similar problem is encountered.

There are many possible ways of connecting shafts of different diameters, but they each have certain deficiencies. The available ways include: (1) using a "heavy" press fit; (2) using a set screw; (3) assembling with cements of various types; (4) using tapered connections; (5) soldering a hub end to the spindle and fitting it over the motor shaft; and (6) forming "self-collets" by boring or slitting and providing clamping means.

The press fit requires extreme tolerance control. The set screw also has tolerance problems, although less severe; and it also is difficult to manufacture and prone to severe "fretting" corrosion. Cemented assemblies suffer from reliability problems, creating severe requirements during the assembling stage. Tapered connections are inherently quite expensive. Use of a hub end fitting over the motor shaft places limitations on heat treatment of the shaft material and uses up valuable vertical space. And the "self-collets" tend to create operating difficulties and to have "fretting" failure.

The purpose of the present invention is to provide a spindle-to-bore connection which avoids the deficiencies discussed above, and which has, to a significant extent, the virtues of:

(a) Relatively inexpensive manufacture because of ease of assembly and avoiding tolerance problems;

(b) Ready adaptability to different dimensional requirements and to the use of different materials in the spindle, the rotor, and the interconnecting means; and (c) Functional reliability because of an effective torque-transmitting capability.

SUMMARY OF THE INVENTION

The present invention provides a method and structure for coupling a small diameter spindle shaft to a larger member having a bore by combining a sleeve which surrounds the spindle with a pair flanges operatively associated with the sleeve and engaging the walls of the bore, such flanges being initially frustoconical to enter the available space, and being subsequently forced into a substantially disc shape to grip the spindle at the inner diameter of the flange and the wall of the bore at the outer diameter of the flange, thereby providing a torque-transmitting connection. Preferably two flanges are provided, at or near opposite ends of the sleeve.

The flanges may be formed as integral parts of the sleeve, or they may be separate members which are restrained by engagement with the sleeve.

The spindle-connecting method of the invention utilizes a two-step, inner-and-outer punch combination for forcing first the remote flange and then the adjacent flange into its disc shape torque-transmitting position.

DETAILED DESCRIPTION OF SPECIFIC EMBODIMENTS

Figure 1:
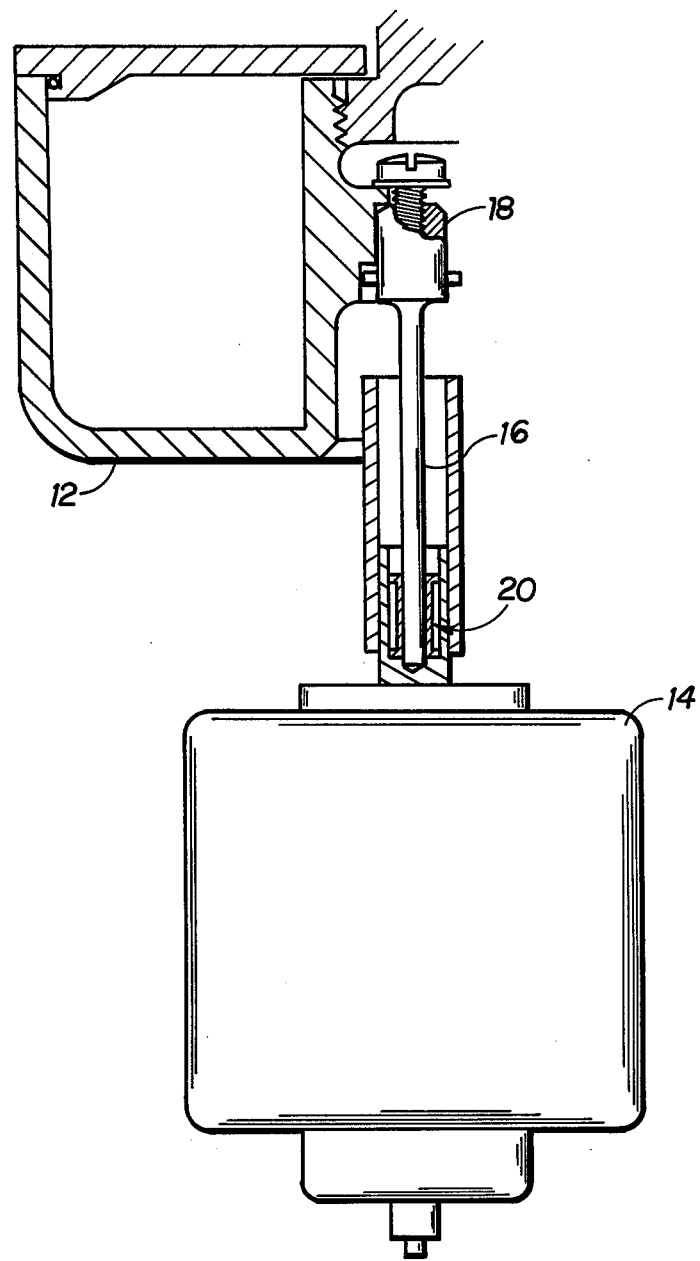
FIG. 1 is a vertical, partly cross-sectional view of an environment in which the invention might be used, e.g., a centrifuge and its driving motor and spindle.

FIG. 1 illustrates a suitable environment for use of the invention. A centrifuge rotor 12 and its driving mechanism are shown, the latter comprising a motor 14, a spindle 16, a first torque-transmitting connection 18 between the spindle 16 and the rotor 12, and a second torque-transmitting connection 20 between the spindle 16 and the motor 14.

The invention is illustrated as the torque-transmitting connection 20 between the spindle and the motor. It also is applicable in any situation having the same, or similar, structural requirements. As FIG. 1 makes clear, the spindle, or shaft, 16 has a very small diameter in comparison to the rotating objects which it interconnects—the rotor and motor. For example, a spindle 3 inches long, having a diameter of 0.1 inch, might be fitted with end portions having a diameter of 0.3 to 0.5 inch.

It is considered highly advantageous to use an element or elements separate from the spindle as the means for providing a torque-transmitting connection between the spindle and the much larger diameter rotating member which drives it or is driven by it. Forming a spindle having a small diameter body and integral larger diameter ends is an expensive manufacturing problem, and in the case of electric motor fabrication may not be feasible. Also, it is preferred that different materials be used for the spindle body and the torque-transmitting larger diameter end portions.

Figure 2:
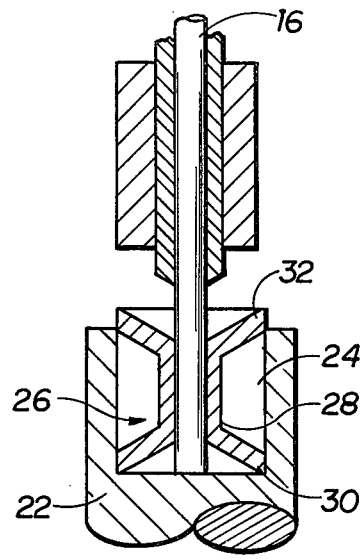
FIG. 2 is a cross-sectional close-up of the lower, or motor-connection, end of the driving spindle of FIG. 1 showing the initial step in forming the spindle connection of the present invention.

FIG. 2 shows the initial assembling of the parts in the preferred embodiment of the present invention. A motor shaft 22, driven by motor 14, has a bore 24 which receives the lower end of the spindle shaft 16. The diameter of bore 24 is substantially larger than the diameter of spindle 16.

Figure 4:
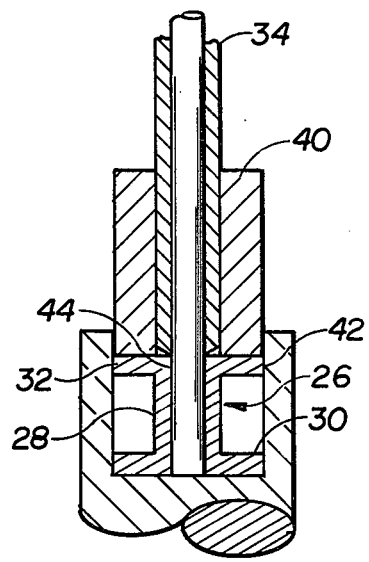
FIG. 4 is a similar view showing the third step which results in the completed spindle-to-motor connection.

In order to provide an inexpensively manufactured, but functionally efficient, torque-transmitting connection between the spindle and the wall of bore 24, a member 26 is inserted between them, which initially has the shape shown in FIG. 2, and ultimately has the shape shown in FIG. 4.

Member 26 comprises a sleeve portion 28 and two frustoconical, integral end flanges 30 and 32. In the initial shape of member 26, the end flanges 30 and 32 are convex and concave respectively and, in addition to having an annular dimension, each have an axial dimension extending beyond the length of sleeve portion 28.

As shown in FIG. 2, the initial insertion of member 26 into bore 24 between spindle 16 and the wall of the bore is accomplished by a non-interfering sliding motion of the sleeve portion 28 onto the spindle, and of the outer peripheries of the flanges 30 and 32 into the bore. Extremely close tolerances are not required. The order in which the spindle 16 and member 28 are placed in position is not critical.

Figure 3:
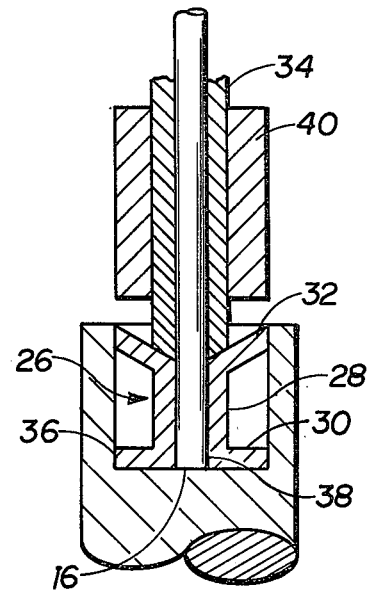
FIG. 3 is a similar view showing the second step in forming the spindle connection.

The next step is shown by FIG. 3, wherein the smaller diameter annular punch 34 has forced the sleeve portion 28 down to the bottom of bore 24, with the result that the formerly frustoconical lower flange 30 has been flattened. The full conical dimension of flange 30 is now compressed into a purely radial dimension. The outer periphery 36 of flange 30 now provides an interference fit with the wall of bore 24; and the inner periphery 38 of flange 30, which is also the lower end of sleeve 28, provides an interference fit with spindle 16.

The final step is shaping member 26 is shown by FIG. 4, wherein the larger diameter annular punch 40 has forced the upper, formerly frustoconical flange 32 into a flat, washer-like shape, with the result that the full conical dimension of flange 32 is now compressed into a purely radial dimension. The outer periphery 42 of flange 32 now provides an interference fit with the wall of bore 24; and the inner periphery 44 of flange 32, which is also the upper end of sleeve 28, provides an interference fit with spindle 16.

Because the material of flanges 30 and 32 has been stressed beyond its elastic limit, the flanges remain flattened after the punches 34 and 40 have been removed. There is now an effective torque-transmitting connection between spindle 16 and the motor shaft 22.

The annular punches 34 and 40 can be moved into their initial position, operated to reshape the flanges 30 and 32, and then removed, by insertion over the upper end of spindle 16 if that end of the spindle has not been itself connected to a rotor. However, it will normally be desirable to make each of the punches 34 and 40 in split form, so that they can be removed after assembly of the final end connection of the spindle.

Figure 5:
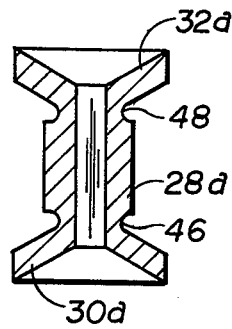
FIG. 5 shows a modified version of the sleeve located between the spindle and the bore into which it extends.

FIG. 5 shows a modified version of the torque-transmitting member between the spindle and the motor. In this version, an intentionally weakened connection is provided between each end of the sleeve 28a and the frustoconical flanges 30a and 32a. Grooves 46 and 48 are formed in the sleeve adjacent the respective flanges. This reduces the force needed to reshape the flanges from the frustoconical to the flat configuration.

Figure 6:
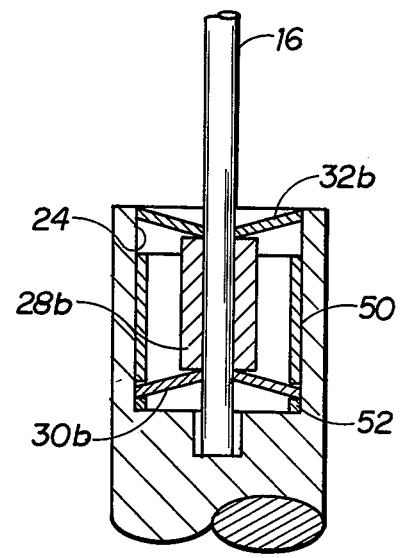
FIG. 6 is a cross-sectional close-up of another version of the invention, in which the sleeve and the gripping members are separate resilient members, the figure illustrating the initial, pre-punch assembly.
Figure 7:
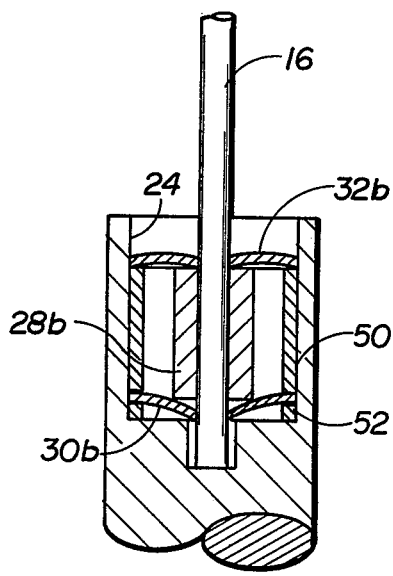
FIG. 7 shows the structure of FIG. 6 after the punches have completed the torque-transmitting connection.

FIGS. 6 and 7 show another modified version of the invention, in which the resilient members which secure the spindle to the motor are not integral with the sleeve. In this version, an inner sleeve 28b encircles the spindle 16, and an outer tube 50 fits inside the bore 24. The locking resilient members are provided by a lower initially convex frustoconical resilient member 30b and an upper initially concave frustoconical resilient member 32b, each of which is a separate element.

The resilient members 30b and 32b initially have the cross-sectional shapes in FIG. 6. The sleeve 28b constitutes a spacer between the inner periphery of resilient member 30b, which is higher than its outer periphery, and the inner periphery of resilient member 32b, which is lower than its outer periphery.

Force exerted by the smaller diameter punch will force sleeve 28b downwardly to force the lower resilient member 30b into the position shown in FIG. 7, in which it has an interference fit at its inner periphery with spindle 16, and an interference fit at its outer periphery with the wall of bore 24. Because the member 30b is made of spring material, it does not permanently deform, but instead, in its reversed position, has a downward spring bias because its inner periphery is below its outer periphery, the latter being supported by a small ring 52.

Thereafter, force exerted by the larger diameter punch will force the outer periphery of upper resilient member 32b downwardly into engagement with the upper end of tube 50, as shown in FIG. 7. In this position, the resilient member 32b has an interference fit at its inner periphery with spindle 16, and an interference fit at its outer periphery with the wall of bore 24, the inner peripheries of member 32b being at approximately the same level vertically, as shown.

A feature of the embodiment of FIGS. 6 and 7 is that exerting a strong upward pull on spindle 16 will release the torque-transmitting connection, because the resilient members 30b and 32b have been operated within their elastic limits.

The embodiment of the invention shown in FIGS. 6 and 7 tends to emphasize the fact that the primary function of the sleeve 28b and of the tube 50 is to space the two locking, or torque-transmitting, resilient members 30b and 32b. This spacing function is, however, also involved in the other embodiments.

A single locking resilient member could be used, but normally two resilient members, at opposite ends of the spacer sleeve, will be desired. Where additional torque-transmitting ability is required, a plurality of sleeve-and-resilient member combinations may be used, each sleeve having resilient members at both ends. In such an arrangement, relatively short sleeves would be used, in order to permit a plurality of sleeves to be inserted into the available bore. For reliability, each unit of such a multiple, or stacked, arrangement should be individually compressed by the two-punch method, instead of attempting to compress the plurality of units simultaneously.

For efficient assembling of sleeve-and-resilient-member units which are not integrally formed, as in the embodiment of FIGS. 6 and 7, a pre-assembly connection should be made with cement, or other suitable means, in order to preclude the accidental inverted assembling of the lower resilient member. In some instances it may be advantageous to increase the friction between the spindle, torque-transmitting connection and bore wall with cements, with fine abrasive material, with grit blasting, etching, knurling, or a combination of such means.

The following claims are intended not only to cover the specific embodiments disclosed, but also to cover the inventive concepts explained herein with the maximum breadth and comprehensiveness permitted by the prior art.

What is claimed is:

1. A torque-transmitting connector for coupling a small diameter spindle shaft to a larger member having a bore into which the shaft extends, said connector comprising:

a sleeve surrounding a portion of the shaft within the bore;

a first flange operatively associately with said sleeve at one end thereof;

said first flange initially having a shape substantially that of a concave frustocone coaxial with said sleeve;

a second flange operatively associated with said sleeve at an end opposite said one end;

said second flange initially having a shape substantially that of a convex frustocone with said sleeve;

each of said flanges initially having an inside aperture large enough to slide over said shaft and an outside diameter small enough to slide into said bore;

each of said flanges subsequently being reformed by pressure exerted thereon parallel to the axis of said sleeve to assume a shape substantially that of a disc perpendicular to the axis of said sleeve; and each of said flanges upon being reformed having an inside aperture small enough to tightly grip the exterior surface of said shaft and having an outside diameter large enough to tightly grip the interior surface of said bore.

2. The torque-transmitting connector of claim 1, wherein the flanges are integral to the connector.

3. The torque-transmitting connector of claim 1, wherein the flanges are integral to the connector and the flanges are reformed beyond the elastic limit thereof from a generally frustoconical initial shape to a substantially disc shape.

4. The torque-transmitting connector defined by claim 3 wherein said sleeve including a pair of circular grooves, each of said grooves being disposed at opposite ends of said sleeve adjacent one of said flanges for reducing the force required for reforming said flanges.

5. A torque-transmitting connector for coupling a small diameter spindle shaft to a larger member having a bore into which said shaft extends, said bore having a surface at the bottom thereof, said connector comprising:

a sleeve surrounding a portion of said shaft within said bore;

a first resilient member disposed adjacent said sleeve at one end thereof;

said first resilient member initially having a shape substantially that of a concave frustocone coaxial with said sleeve;

a second resilient member disposed adjacent said sleeve at an end opposite said one end;

said second resilient member initially having a shape substantially that of a convex frustocone coaxial with said sleeve;

each of said resilient members initially having an inside aperture large enough to slide over said shaft and an outside diameter small enough to slide into said bore;

a ring member in said bore disposed between said second resilient member and said surface of said bore;

an outer tube in said bore disposed between said first resilient member and said second resilient member;

each of said resilient members subsequently being reformed by pressure exerted thereon parallel to the axis of said sleeve, said first resilient member being reformed substantially perpendicular to the axis of said sleeve;

said second resilient member being reformed from a convex to a concave shape; and each of said resilient members upon being reformed having an inside aperture small enough to tightly grip the exterior surface of said shaft and having an outside diameter large enough to tightly grip the interior surface of said bore.

* * * * *